United States Patent
Bernstein et al.

(10) Patent No.: US 8,797,854 B2
(45) Date of Patent: Aug. 5, 2014

(54) SCHEDULING FOR RF OVER FIBER OPTIC CABLE [RFOG]

(75) Inventors: Alon Bernstein, San Jose, CA (US); John Skrobko, Berkeley Lake, GA (US); John T. Chapman, Laguna Niguel, CA (US)

(73) Assignee: Cisco Technology, Inc., San Jose, CA (US)

(*) Notice: Subject to any disclaimer, the term of this patent is extended or adjusted under 35 U.S.C. 154(b) by 1018 days.

(21) Appl. No.: 12/240,684

(22) Filed: Sep. 29, 2008

(65) Prior Publication Data
US 2010/0083330 A1 Apr. 1, 2010

(51) Int. Cl.
*H04L 12/28* (2006.01)
*H04L 12/56* (2006.01)

(52) U.S. Cl.
CPC ........................ *H04L 47/15* (2013.01)
USPC ........................ 370/230; 370/329

(58) Field of Classification Search
CPC ........................................ H04L 47/15
USPC ........................................ 370/329
See application file for complete search history.

(56) References Cited

U.S. PATENT DOCUMENTS

| | | | |
|---|---|---|---|
| 4,977,593 A | 12/1990 | Ballance | |
| 5,153,763 A | 10/1992 | Pidgeon | |
| 6,275,990 B1 | 8/2001 | Dapper et al. | |
| 7,206,321 B1 | 4/2007 | Bansal et al. | |
| 7,359,332 B2 | 4/2008 | Kolze et al. | |
| 2004/0057502 A1* | 3/2004 | Azenkot et al. | 375/147 |
| 2005/0025145 A1* | 2/2005 | Rakib et al. | 370/389 |
| 2005/0141460 A9* | 6/2005 | Currivan et al. | 370/335 |
| 2006/0126660 A1 | 6/2006 | Denney et al. | |
| 2008/0037545 A1 | 2/2008 | Lansing et al. | |
| 2009/0049492 A1 | 2/2009 | Pantelias | |
| 2009/0103918 A1* | 4/2009 | Tsuge et al. | 398/45 |
| 2011/0194508 A1* | 8/2011 | Beser | 370/329 |

OTHER PUBLICATIONS

Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.
Volpe, "DOCSIS and Cable Modems—How it works :: Tutorial", [online], (2010) [retrieved on Jan. 14, 2014]. Retrieved from the Internet: URL: <http://volpefirm.com/docsis101_wrap-up/>, pp. 1-6.
Cablelabs, "Data Over Cable Service Interface Specifications, DOCSIS 3.0, Physical Layer Specification, CM-SP-PHYv3.0-105-07-08-03", [online], (Aug. 3, 2007) [retrieved on Jan. 14, 2014]. Retrieved from the Internet: URL: <http://www.cablelabs.com/specification/docsis-3-0-physical-layer-interface-specification/?v=6>, 165 pages.

* cited by examiner

*Primary Examiner* — Wanda Z Russell
(74) *Attorney, Agent, or Firm* — Leon R. Turkevich

(57) ABSTRACT

A method for use in an RFoG cable network calls for allocating upstream bandwidth to CM devices, wherein allocating bandwidth includes selecting a start time and allocating respective time slots relative to the selected start time to at least one of the requesting CM devices; and further, allocating the same timeslots over multiple selected upstream channels, thereby aligning upstream transmissions from the requesting CMs across the selected upstream channels. Several embodiments are disclosed to enable DOCSIS 3.0 type scheduling over an RFoG network.

21 Claims, 6 Drawing Sheets

| Start time 1234113 | US ID 01 | SID 12 8 minislots | SID 422 4 minislots | SID 87 12 minislots | N u L L |

FIG. 3

| Start time 1234113 | US ID 01 | SID 12 8 minislots | SID 422 4 minislots | SID 87 12 minislots | N u L L |

| Start time 1234113 | US ID 02 | SID 12 8 minislots | SID 422 4 minislots | SID 87 12 minislots | N u L L |

| Start time 1234113 | US ID 03 | SID 12 8 minislots | SID 422 4 minislots | SID 87 12 minislots | N u L L |

| Start time 1234113 | US ID 04 | SID 12 8 minislots | SID 422 4 minislots | SID 87 12 minislots | N u L L |

| Start time 1234113 | CID 01 | SID 12 2 minislots | SID 422 1 minislots | SID 87 3 minislots | Null |
| Start time 1234113 | CID 01 | SID 12 2 minislots | SID 422 1 minislots | SID 87 3 minislots | Null |
| Start time 1234113 | CID 01 | SID 12 2 minislots | SID 422 1 minislots | SID 87 3 minislots | Null |
| Start time 1234113 | CID 01 | SID 12 2 minislots | SID 422 1 minislots | SID 87 3 minislots | Null |

| Start time 1234113 | US ID 011 | SID 12 8 minislots | NULL | NULL | N u L L |

| Start time 1234113 | US ID 011 | NULL | SID 422 4 minislots | NULL | N u L L |

| Start time 1234113 | US ID 011 | NULL | NULL | NULL | N u L L |

| Start time 1234113 | US ID 011 | NULL | NULL | SID 87 12 minislots | N u L L |

| Start time 1234113 | CID 01 | SID 12 8 minislots | SID 422 4 minislots | SID 87 12 minislots | N U L L |
| Start time 1234113 | CID 02 | SID 12 8 minislots | SID 422 4 minislots | SID 87 12 minislots | N U L L |
| Start time 1234113 | CID 03 | SID 12 8 minislots | SID 422 4 minislots | SID 87 12 minislots | N U L L |
| Start time 1234113 | CID 04 | SID 12 8 minislots | SID 422 4 minislots | SID 87 12 minislots | N U L L |

SCHEDULING FOR RF OVER FIBER OPTIC CABLE [RFOG]

TECHNICAL FIELD

The present disclosure relates generally to the field of cable networks.

BACKGROUND

Selected Acronyms

DOCSIS Data Over Cable Service Interface Specification.

DPON DOCSIS PON. See DOCSIS and PON. DPON is used to refer to a type of PON that implements DOCSIS service layer on existing Ethernet PON, MAC and PHY layers.

EPON (or GEPON) Ethernet PON.

FTTH Fiber To The Home, refers to fiber optic cable that replaces the standard copper wire of the local Telco. FTTH can carry high-speed broadband services integrating voice, data and video, and runs directly to the junction box at a home or building. Also called Fiber To The Building (FTTB), or Fiber-to-the-Subscriber (FTTx).

ONU Optical Network Unit

PON Passive Optical Network, is a point-to-multipoint, fiber to the premises network architecture in which unpowered optical splitters are used to enable a single optical fiber to serve multiple premises, typically 32-128.

RFoG (or RF-PON) "RF over Glass"—encapsulates existing RF traffic and pipes it over fiber. This is an analogue transmission over fiber as distinguished from EPON/GPON technologies.

rtPS Real Time Polling Service—a scheduling service to resolve contentions and conversely avoid collisions in data communications. Related—nrtPS Non-real Time Polling Service.

USCB mode of operation of a network—Upstream Channel Bonding.

Data Over Cable Service Introduction

Cable operators have widely deployed high-speed data services on cable television systems. These data services allow subscriber-side devices, such as personal computers, to communicate over an ordinary cable TV network Hybrid Fiber Coax (HFC) cable. Cable Television Laboratories, Inc. (CableLabs®) publishes detailed technical specifications for such systems, including DOCSIS—Data Over Cable Service Interface Specification. Referring to FIG. 1, in typical cable systems 100, a Cable Modem Termination System (CMTS) 102 (or a modular CMTS called "M-CMTS")[1] connects the cable network 104 to a data network, such as the Internet 106. A downstream QAM 110 receives data transferred from the CMTS over a packet switched portion of the network, performs modulation and other processing, and then transfers the modulated data over a Hybrid Fiber Coaxial (HFC) portion 120 of the cable network to subscribers. This is called the "downstream" direction.

[1] The EQAM is not included with the core in a modular CMTS. Some systems may utilize a Universal Edge QAM device, or "UEQAM" for short, which typically comprises a chassis having one or more gigabit Ethernet (GigE) input ports, and multiple QAM modulators and RF upconverters on the output (downstream) side. The present invention is applicable to all of these architectures, including both Integrated CMTS and Modular CMTS. In that regard, we use "CMTS" herein in the broad, generic sense.

In general, this HFC or coax cable feeds the last link (for example, over the last half mile or less) to an individual home or other structure. There, a cable modem (CM) 130 may provide an packet interface, for example Ethernet compliant, to various consumer premises equipment (CPE) 132 such as a personal computer. The CM may be connected to a hub or router (not shown), for example to implement a home network, wireless access, etc. The CM (or a second CM) may be implemented in other equipment, for example a "set-top-box" (STB) 140 which provides an interface to a television 142.

DOCSIS specifies that the cable modems obtain upstream bandwidth according to a request/grant scheme because the upstream channel is shared. A cable modem sends a bandwidth allocation request when it receives a packet from a subscriber device and the packet needs to be sent upstream into the cable network. The CMTS scheduler grants these requests using bandwidth allocation map ("MAP") messages. MAP messages inform the CMs about specific allocations of upstream spectrum in the time dimension, using time slots or "minislots." The requesting modem then waits for its scheduled time before it can begin transmission. In this way, the system avoids collisions in upstream transmissions from multiple CMs. The DOCSIS specifications also provide other scheduling modes in which the CMTS grants bandwidth to the modem without an explicit request from the cable modem. One example is the UGS (Unsolicited Grant Service) mode. Unsolicited Grant Service is an Upstream Flow Scheduling Service Type that is used for mapping constant bit rate (CBR) traffic onto Service Flows. Since the upstream is scheduled bandwidth, a CBR service can be established by the CMTS scheduling a steady stream of grants. These are referred to as unsolicited because the bandwidth is predetermined, and there are no ongoing requests being made. The classic example of a CBR application is Voice over Internet Protocol (VoIP) packets.

In addition, individual CMs are assigned to specific frequency "channels." In this way, more than one CM may actually transmit at the same time, but they are separated by frequency division multiplexing. U.S. Pat. No. 7,386,236 (Kuo et al.) describes a multiple wavelength TDMA optical network. DOCSIS 3.0 allows a single CM to transmit on multiple upstreams (channels), as further discussed below. In other words, a DOCSIS 3.0 enabled CM would have multiple transceivers simultaneously operable at different frequencies.

Recently, especially in newer communities, service providers (or developers) are implementing fiber to the home (FTTH), in other words, running "fiber" or "glass" (optical fiber cable) all the way from the head end or distribution hub to the home. FTTH is desirable because it can carry high-speed broadband services integrating voice, data and video. Accordingly, separate traditional telephone lines (copper) may no longer be necessary. And coax to the home for internet access and television programming may be obviated as well. RF over Fiber ("RFoG") is advantageous because the analog RF signals transmitted over fiber (in the form of photons) incur little loss, even over run lengths of many miles, whereas losses over coax can be significant, requiring the use of repeaters or amplifier equipment every 1000 to 2000 feet. Fiber is also essentially immune to EM interference and unauthorized eavesdropping. That said, RFoG presents new transmission scheduling challenges and opportunities. One aspect of the present invention is directed to improvements in upstream scheduling for RF over glass.

Several preferred examples of the present application will now be described with reference to the accompanying drawings. Various other examples of the invention are also possible and practical. This application may be exemplified in many different forms and should not be construed as being limited to the examples set forth herein.

BRIEF DESCRIPTION OF THE DRAWINGS

FIG. 3 is a simplified block diagram illustrating one example of a MAP message for allocating upstream bandwidth.

FIG. 4 is a simplified block diagram illustrating a group of replicated MAP messages for scheduling RFoG using multiple upstream channels.

FIG. 5 is a simplified block diagram illustrating a plurality of replicated MAP messages for scheduling RFoG in an alternative embodiment.

FIG. 6 is a simplified block diagram illustrating MAP messages for scheduling RFoG in another alternative embodiment.

FIG. 7 is a simplified block diagram illustrating MAP messages for scheduling RFoG in another alternative embodiment.

DESCRIPTION OF ILLUSTRATIVE EMBODIMENTS

Figure 1:
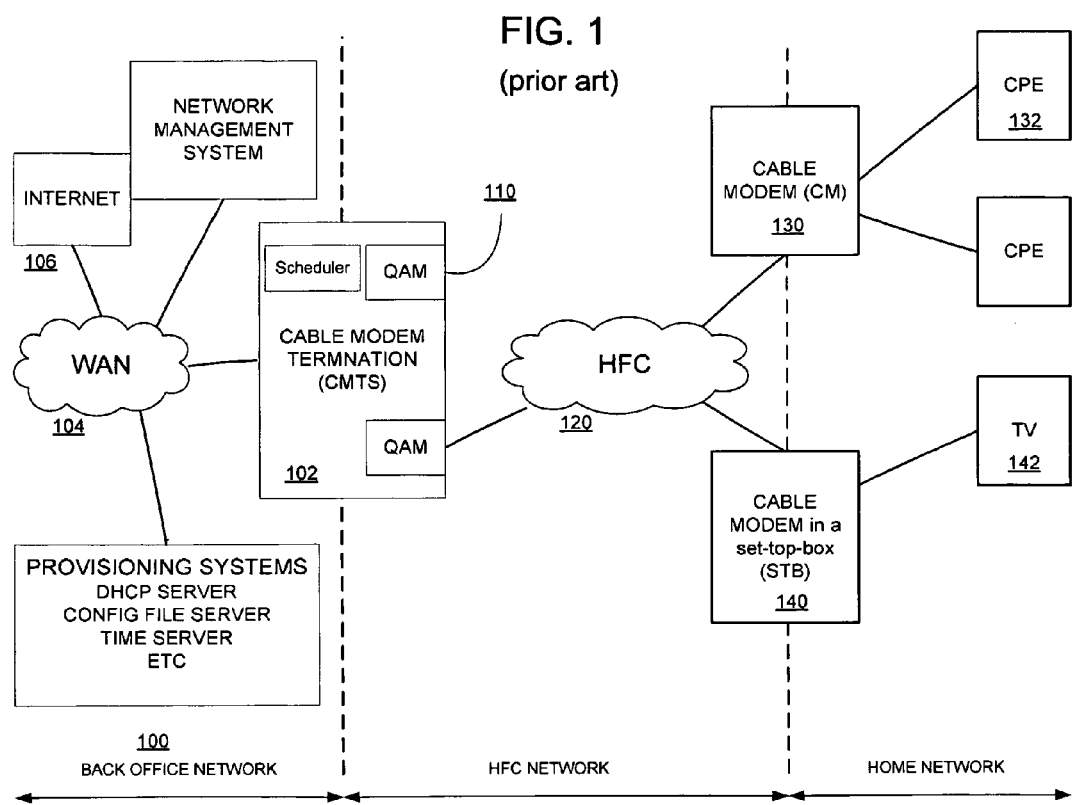
FIG. 1 is a simplified block diagram illustrating a DOCSIS network.

The figures listed above illustrate examples of the application and operation of aspects of the invention. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

Figure 2:
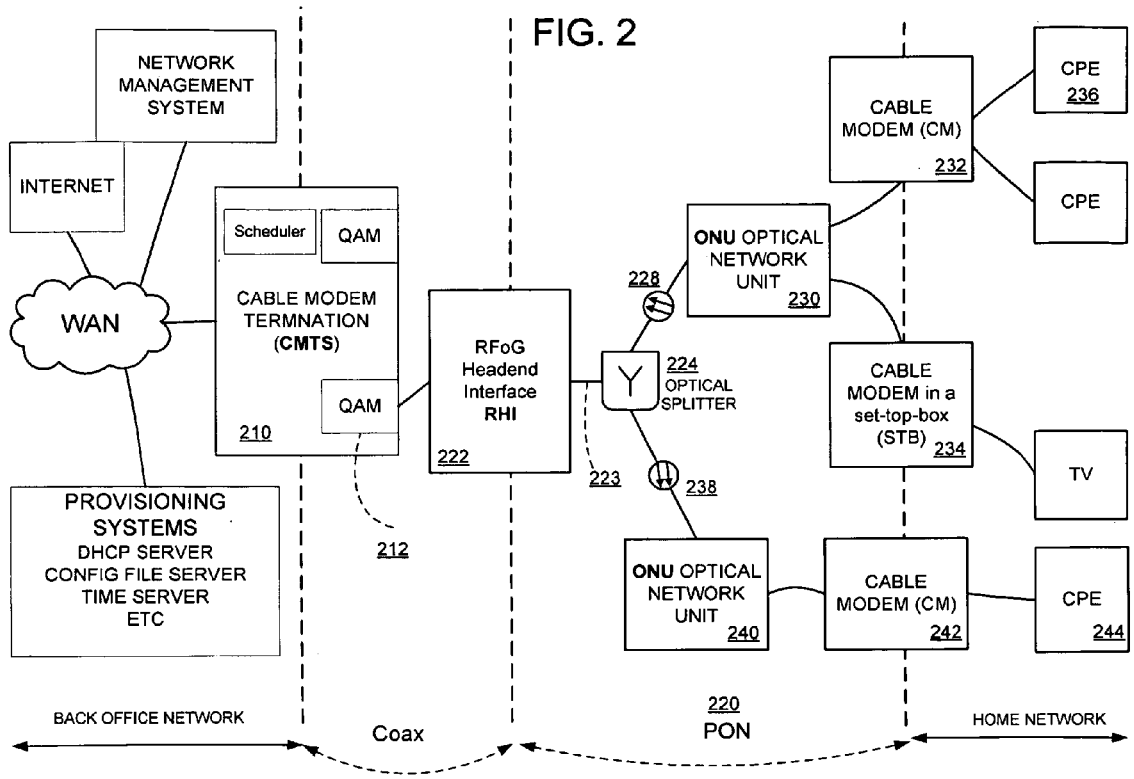
FIG. 2 is a simplified block diagram illustrating an RF over glass network.

A simplified FTTH network is described next, by way of illustration rather than limitation, with reference to FIG. 2. A QAM 212 of CMTS 210 is coupled to an RFoG Headend Interface ("RHI") 222 for converting the RF signals between coax and glass media; in other words, it provides an interface from coax to the passive optical network (PON) 220. At least one fiber 223 is coupled to the downstream side of the RHI 222. Fiber 223 may be coupled to a passive optical splitter 224. For example, splitter 224 may couple or "split" the signal from fiber 223 into, for example, 32-128 individual fibers 228, 238 (only two are shown). The splitter may be passive. It is bidirectional, acting as a collector or aggregator in the upstream direction, as further discussed later. In typical systems, an RHI is composed of an optical transmitter and EDFA (Erbium-Doped Fiber Amplifier) for downstream, an optical receiver for upstream, and a shared WDM module.

Downstream from the splitter, PON 220 may include one or more user nodes, called optical network units (ONUs). In FIG. 2, fiber 228 is coupled to ONU 230, and fiber 238 is coupled to ONU 240. Each ONU typically serves an individual home or building. In general, an ONU is a single integrated electronics unit that terminates the PON and converts optical signals to electronic signals on coax. The ONU typically will have little or no local "intelligence." The ONU may be located at a junction box, for example, on the outside of a building. An ONU typically requires a separate subscriber unit to provide native user services such as telephony, Ethernet data, or video. For example, in FIG. 2, ONU 230 is coupled to a CM 232, which in turn provides data service to CPE 236. ONU 230 also provides video via the CM in STB 234, etc. Finally, in this example, ONU 240 is coupled to CM 242 which serves CPE 244 such as a home computer. ONUs 230 and 240 serve two different premises, respectively.

Bandwidth Scheduling Issues

As explained above, RF over glass ("RFoG") encapsulates existing RF traffic, such as that found on HFC, and pipes it over fiber to the home. RFoG systems generally can use existing CMTS and related cable modem equipment (and software), as illustrated in FIG. 2, but improvements in software implementations and methodologies may be advantageous in various implementations.

In HFC networks, the well-known MAP request/grant scheduling scheme was adequate to avoid collisions in upstream data transmissions from multiple CMs. A problem arises in the RFoG context, however, because RF over glass is an analog copy of the whole spectrum, i.e., the whole channel lineup of multiple frequencies. Because the optical splitter in reverse (upstream) becomes an aggregator, multiple upstream transmissions could occur at the same time and collide, leading to the possibility of Optical Beat Interference. All of them are aggregated at the splitter and sent upstream over a single fiber to the head end. Known DOCSIS scheduling only works to avoid collisions on a single channel. It does not provide for managing multiple upstream scheduling in RFoG networks of the type described herein.

An Illustrative Implementation

Scheduling in an RFoG network requires that different CMs in different households or other premises (i.e., connected to different ONUs) cannot be scheduled for upstream transmission at the same time. Assume for example a network generally of the type described above with reference to FIG. 2. CM 232 and CM 242 cannot be scheduled at the same time, even if on different frequencies, as the corresponding upstreams will travel via ONU 230 and ONU 240, respectively, and be aggregated in the splitter 224. To avoid this condition, in accordance with one aspect of the invention, upstreams may be scheduled as follows. First, a standard scheduler routine can be used to configure a virtual channel, for example a 120 mbps channel (the aggregate throughput of 4×30 mbps where each 30 mbps channel is consistent with DOCSIS specifications). Although DOCSIS does not support a 120 mbps single channel rate, a "virtual" modulation profile can be configured to appear as a standard DOCSIS modulation profile. The scheduler receives upstream bandwidth requests from the CMs (via the corresponding ONUs), and allocates bandwidth in response to the bandwidth requests. The grants may be reflected in a MAP message, which we will call a "virtual MAP message." A simple example of a virtual MAP message is illustrated in FIG. 3. Referring to FIG. 3, the MAP message includes a start time, a channel identifier ("US ID"), a series of bandwidth (minislot) allocations to various CMs identified by respective SIDs, and a null field to demarcate the MAP message.

Next, the method calls for replicating the virtual MAP message to multiple upstreams. That is, we generate a plurality of MAP messages, each having the same start time and the same grants (allocations of mini timeslots) as the virtual MAP message. To illustrate, FIG. 4 illustrates a group of four replicated MAP messages, based on the virtual MAP message of FIG. 3. These messages differ, however, in that each one specifies a different upstream channel identifier ("US ID"). In this example, channel identifiers 01, 02, 03 and 04 are used. The identifiers themselves can take any form, it is not critical, as long as they uniquely identify different upstream channels. In practice, an 8-bit identifier is often used. Each channel or "upstream" has a corresponding assigned center frequency.[2] These "replicated" MAPs are transmitted downstream via the ONUs to the CMs. (They are not literally "replicated" as they differ at least in the US IDs.)

[2]The channels are assigned at CM initialization and ranging processes. Changes may be made to upstream channel assignments dynamically; see U.S. Pat. No. 7,359,332.

In the CMs, the MAP messages are parsed. Where the channel (US ID) and SID match those assigned to the CM, it will transmit upstream in the minislots assigned to it. In the present example of FIG. 4, multiple MAP messages for exactly the same time slots are disseminated. Consequently, the various CMs assigned to the corresponding US IDs (here, 01-04), will broadcast on the corresponding upstreams, but all having the same start time. In this regard, the upstreams are temporally aligned.

By aligning these upstream transmissions, multiple channels can be used at the same time. Even though the upstreams are aggregated together at the optical splitter, collisions are avoided by virtue of the time division allocations already provided by the scheduler in the virtual MAP message (FIG. 3). The multiple channels must include all of the currently available upstream channels for the subject CMTS. Because all channels are accounted for, and aligned, the CMs will not activate more than one ONU at the same time, so the ONUs will not interfere with each other.[3] If a channel is not used, a grant can still be scheduled on it, or a NULL grant scheduled. The individual channels can be any mix of modulation types, symbol rates, TDMA or S-CDMA as specified in the DOGCSIS3.0 Physical Layer specification [DOCSIS PHY], and can be any mix of adjacent or non-adjacent upstream channels.

[3]Even where two or more ONUs send data upstream concurrently on different center frequencies, they may cause interference and thus signal degradation due to beat frequencies.

It should be noted that the constructs of a "virtual MAP message" and "replicated MAP messages" are provided only to illustrate aspects of the invention. Particular implementations or embodiments may vary. They need not literally create a virtual MAP message; rather, it serves here mainly to describe the replicated MAP messages.

Referring again to FIG. 4, four MAP messages, corresponding to four upstreams, are shown as illustrative; the number of upstreams is not critical. Some new CMs consistent with DOCSIS 3.0 may have four transceivers. Thus, they would be capable of operating on four upstreams as the same time. For example, if each upstream provides 30 mbps maximum bandwidth, the combined four channels would reach up to 120 mbps. Other future CMs or similar devices may provide even more channels, in which the disclosed alignment aspect of the present invention can be duly extended, and corresponding gains achieved in total bandwidth.

Additional Embodiments

DOCSIS 2.0 introduced the concept of a "logical channel." In contrast to DOCSIS 1.1, where each channel on a single physical plant segment must use a different center frequency, DOCSIS 2.0 allows the coexistence of multiple "logical channels" using the same spectrum on the same physical plant segment. Each logical channel is described by its own UCD message; this allows CMs on different logical channels to use different physical layer parameters (although all CMs on the same logical channel must use the same physical layer parameters). To prevent these logical channels from interfering with each other, the CMTS schedules the various logical channels using a particular spectrum for different time slots, so that at any given time only one such logical channel is transmitting, while the others are scheduled for idle slots during this time. FIG. 6 illustrates a set of four logical channels of the type described, operating on physical channel 011. In this way, only one upstream is active at a time. The scheme of FIG. 6 is known.

In accordance with another aspect of the invention, it becomes possible to send actual (not null) grants on all, upstreams, as long as they all go to the same CM, for example a four-channel CM of the type discussed above. Thus, instead of sending a NULL grant as in the logical channel approach, a scheduler can grant all channels to the same SID, using a variation of the replication methodology described above. In this case, the resulting MAPs are shown in FIG. 7, again using four upstreams for illustration.

In another embodiment, the length of each grant (number of mini timeslots) may be divided by a selected integer. For example, if the MAP allocation is replicated to four upstreams, the length of each grant can be divided by four, to maintain the same total bandwidth allocation. FIG. 5A shows four such MAP messages, based again on the virtual MAP of FIG. 3, with each grant length divided by four.

Pre-DOCSIS 3.0 modems can be supported as well, but the bandwidth grants for them may not be divided, as they do not support channel bonding. In such cases, the bandwidth granted on channels that the modem cannot access is simply ignored, so the MAP replication code need not necessarily distinguish pre-3.0 from 3.0-compatible CMs.

Additional Implementation Notes

In another aspect of the invention, it may be desirable to ensure that the ONUs are transmitting data upstream only when scheduled. In order to identify "misbehaving" ONUs, the scheduler may send a null grant message (for example, "“null grant$#148") periodically. If power is detected during the null grant, it indicates that one or more ONUs are sending data when they should not. NULL grant messages for this purpose may be sent periodically.

There are several ways to schedule a "dead time". Known scheduler code already schedules NULLs as part of the spectrum management feature, although these NULLs may not be sent on all upstreams at once. If not, then one alternative is to occasionally replace or "steal" the Initial Maintenance slots (they are scheduled approximately every 120 ms) with a NULL grant. Since Initial Maintenance slots are aligned across upstreams[4] this will guarantee a quiet time of about 2 ms across all of the upstreams in typical systems.

[4]See DOCSIS 3.0 version I08 Appendix II.

There are times at which simultaneous US traffic is allowed, for example a contention slot or a broadcast slot. These are used by the CMs to send a request for US bandwidth as discussed above. In RFoG (and other contexts), these US messages can collide, but back-off and re-try algorithms are used to accommodate them. In some RFoG implementations, if no changes are made, these collisions may have a minor but acceptable impact.

In some presently preferred embodiments, a polling mode may be used to advantage for scheduling instead of a contention channel. For example, the Real-Time Polling Service (rtPS) is designed to support real-time service flows that generate variable size data packets on a periodic basis, such as MPEG video. The service offers real-time, periodic, unicast request opportunities, which meet the flow's real-time needs and allow the CM to specify the size of the desired grant. This service requires more request overhead than UGS, but supports variable grant sizes for optimum data transport efficiency. Real-time polling, or non-real-time polling (nrtps) may be used in the described RFoG system to avoid US collisions in the bandwidth allocation process.

Another broadcast slot is a new CM—Initial Ranging Request—to register a new CM (or newly powered up CM) with the CMTS. These requests also may collide on occasion, but relatively infrequently. The consequences are likely to be acceptable in normal operation for most systems.

Several examples have been described above with reference to the accompanying drawings. Various other examples of the invention are also possible and practical. The system may be exemplified in many different forms and should not be construed as being limited to the examples set forth above. The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, aspects of the invention may be implemented in a digital computing system, for example a CPU or similar processor in a CMTS that provides scheduling functions. More specifically, by the term "digital computing system," we mean any system that includes at least one digital processor and associated memory, wherein the digital processor can execute instructions or "code" stored in that memory. (The memory may store data as well.) The term "scheduler" is sometimes used as a shorthand reference to a software program that performs bandwidth scheduling functionality.

A digital processor includes but is not limited to a microprocessor, multi-core processor, DSP (digital signal processor), GPU, processor array, network processor, etc. A digital processor (or many of them) may be embedded into an integrated circuit. In other arrangements, one or more processors may be deployed on a circuit board (motherboard, daughter board, rack blade, etc.). Aspects of the present invention may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example RAM or FLASH memory embedded in an integrated circuit CPU, network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, the present invention may be implemented or embodied in computer software (also known as a "computer program" or "code"; we use these terms interchangeably). Programs, or code, are most useful when stored in a digital memory that can be read by one or more digital processors. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A Cable Modem Termination System (CMTS) for use in a radio frequency over glass (RFoG) network comprising:
    a scheduler stored in non-transitory machine-readable media for scheduling upstream bandwidth for cable modems (CMs) via an optical network having optical network units for transmitting upstream channels by the respective cable modems, and at least one optical splitter for optically aggregating the upstream channels;
    wherein the scheduler is arranged to replicate upstream bandwidth allocation grants for all of the upstream channels that are available to the cable modems, ensuring all of the upstream channels are temporally aligned and that no cable modems are scheduled for upstream transmission at the same time, even if on different frequencies, so that the optical network units do not optically interfere with each other relative to the optical aggregation of the upstream channels for avoidance of optical beat interference.

2. The CMTS according to claim 1 wherein the scheduler replicates the upstream bandwidth allocation grants by generating multiple bandwidth allocation map (MAP) messages, each MAP message assigning the allocation grants on a respective one of the upstream channels.

3. The CMTS according to claim 2 wherein the MAP messages assign the upstream bandwidth allocation grants to four upstream channels.

4. The CMTS according to claim 3 wherein the four upstream channels are selected for compatibility with a DOCSIS 3.0 compliant CM having at least four transceivers, thereby increasing the CM bandwidth by up to a factor of four.

5. The CMTS according to claim 1 wherein the CMTS schedules the upstream bandwidth based on polling the CMs, an unsolicited grant service, or a request/grant procedure.

6. Scheduler software code stored in non-transitory machine-readable media for execution on a processor in a radio frequency over glass (RFoG) network, the code comprising:
    first code for receiving upstream bandwidth requests from a plurality of cable modem (CM) devices in the RFoG network, the RFoG network including optical network units for transmitting the upstream channels by the respective cable modems, and at least one optical splitter for optically aggregating the upstream channels;

second code for allocating upstream bandwidth responsive to the requests, the allocations including selecting a start time and allocating respective time slots relative to the selected start time to at least one of the requesting CM devices; and third code for replicating the time slot allocations for all of the upstream channels that are available to the cable modems, ensuring all of the upstream channels are temporally aligned and that no cable modems are scheduled for upstream transmission at the same time, even if on different frequencies, so that the optical network units do not optically interfere with each other relative to the optical aggregation of the upstream channels for avoidance of optical beat interference.

7. The scheduler software code of claim 6 wherein the third code replicates the time slot allocations by generating a plurality of bandwidth allocation map (MAP) messages, each MAP message granting the same time slot allocations on a different one of the multiple upstream channels.

8. The scheduler software code of claim 7 including code for selecting the upstream channels consistent with DOCSIS 3.0 specifications.

9. The scheduler software code of claim 7 wherein the third code divides a virtual allocation of minislots by the number of the multiple upstream channels.

10. The scheduler software code of claim 7 wherein the third code replicates the time slot allocations over four upstream channels, for compatibility with CMs having four transceivers.

11. The scheduler software code of claim 7 wherein the code is arranged for execution in conjunction with a cable modem termination system (CMTS).

12. The scheduler software code of claim 7 wherein the second code includes code for scheduling logical channels; and wherein the third code replaces NULL grants of the logical channels with grants of minislots to the same SID on all channels.

13. A method for use in a radio frequency over glass (RFoG) cable network comprising:

determining upstream bandwidth requirements for a plurality of cable modem (CM) devices in the RFoG network, each CM device having a corresponding service identifier (SID), the RFoG network including optical network units for transmitting the upstream channels by the respective CM devices, and at least one optical splitter for optically aggregating the upstream channels; and allocating bandwidth to the CMs, wherein allocating bandwidth includes:

selecting a start time and allocating respective time slots relative to the selected start time to at least one of the CM devices; and allocating the same timeslots relative to the selected start time for all of the upstream channels that are available to the cable modems, thereby aligning upstream transmissions from the CMs across all of the upstream channels available to the cable modems and ensuring no cable modems are scheduled for upstream transmission at the same time, even if on different frequencies, so that the optical network units do not optically interfere with each other relative to aggregation of the upstream channels for avoidance of optical beat interference.

14. The method of claim 13 wherein the bandwidth allocations are transmitted downstream in the network in a group of bandwidth allocation map (MAP) messages, each MAP message of the group allocating bandwidth relative to the selected start time on a corresponding one of the upstream channels.

15. The method of claim 14 and further comprising scheduling a NULL grant over all of the upstream channels, and then detecting transmitted power, if any, on one of the upstream channels during the NULL grant, to identify a malfunctioning optical network unit (ONU).

16. The method of claim 15 wherein scheduling the NULL grant includes replacing an Initial Maintenance slot with a NULL grant whereby the NULL grants are aligned over the upstream channels.

17. The method of claim 14 wherein an integer N upstream channels are selected, thereby providing up to N times increase in total upstream bandwidth allocated to the requesting CMs.

18. The method of claim 14 wherein the upstream channels are configured consistent with DOCSIS 3.0 specifications.

19. The method of claim 14 wherein at least one of the requesting CMs has at least two transceivers, each transceiver compatible with a corresponding one of the upstream channels, whereby the CM can transmit at a rate up to at least two times its single-channel rate.

20. The method of claim 14 wherein allocating bandwidth to the CMs includes conducting non-real time polling of the CMs to avoid upstream request collisions.

21. The method of claim 14 wherein the method is implemented in a scheduler of the RFoG cable network, and further including:

scheduling an Initial Maintenance (IM) slot on at least one of the upstream channels;

receiving upstream Initial Maintenance messages from the CMs; and in the event of a collision among the upstream Initial Maintenance messages, employing a re-try algorithm.

* * * * *